(12) United States Patent
Bart et al.

(10) Patent No.: US 7,743,598 B2
(45) Date of Patent: Jun. 29, 2010

(54) SEALING SYSTEM FOR THE REAR LUBRICATING CHAMBER OF A JET ENGINE

(75) Inventors: Jacques Rene Bart, Verrieres le Buisson (FR); Stephane Rousselin, Hericy (FR)

(73) Assignee: Snecma, Paris (FR)

( * ) Notice: Subject to any disclaimer, the term of this patent is extended or adjusted under 35 U.S.C. 154(b) by 978 days.

(21) Appl. No.: 11/461,614

(22) Filed: Aug. 1, 2006

(65) Prior Publication Data

US 2007/0028590 A1 Feb. 8, 2007

(30) Foreign Application Priority Data

Aug. 2, 2005 (FR) .................................. 05 08232

(51) Int. Cl.
*F02C 7/06* (2006.01)
*F02G 3/00* (2006.01)
(52) U.S. Cl. .................................................... 60/39.08
(58) Field of Classification Search ................ 60/39.08; 184/6.11
See application file for complete search history.

(56) References Cited

U.S. PATENT DOCUMENTS 3,823,553 A * 7/1974 Smith ........................... 60/791
4,502,274 A * 3/1985 Girault ...................... 60/39.08
6,516,618 B1* 2/2003 Bock ........................... 60/782

FOREIGN PATENT DOCUMENTS

| CH | 327444 | 1/1958 |
|----|--------|--------|
| EP | 0 391 001 A1 | 10/1990 |
| FR | 2028999 | 10/1970 |
| FR | 2 524 064 | 9/1983 |
| GB | 2 366 842 A | 3/2002 |

* cited by examiner

*Primary Examiner*—Michael Cuff
*Assistant Examiner*—Andrew Nguyen
(74) *Attorney, Agent, or Firm*—Oblon, Spivak, McClelland, Maier & Neustadt, L.L.P.

(57) ABSTRACT

A jet engine with a system for recovering oil around the lubricating chamber of the rear rolling bearing of the shaft of the jet engine. The shaft is supported by a rolling bearing situated in a lubricating chamber surrounded by a single recovery chamber having a seal situated downstream from the rotor of the turbine driving the shaft.

6 Claims, 1 Drawing Sheet

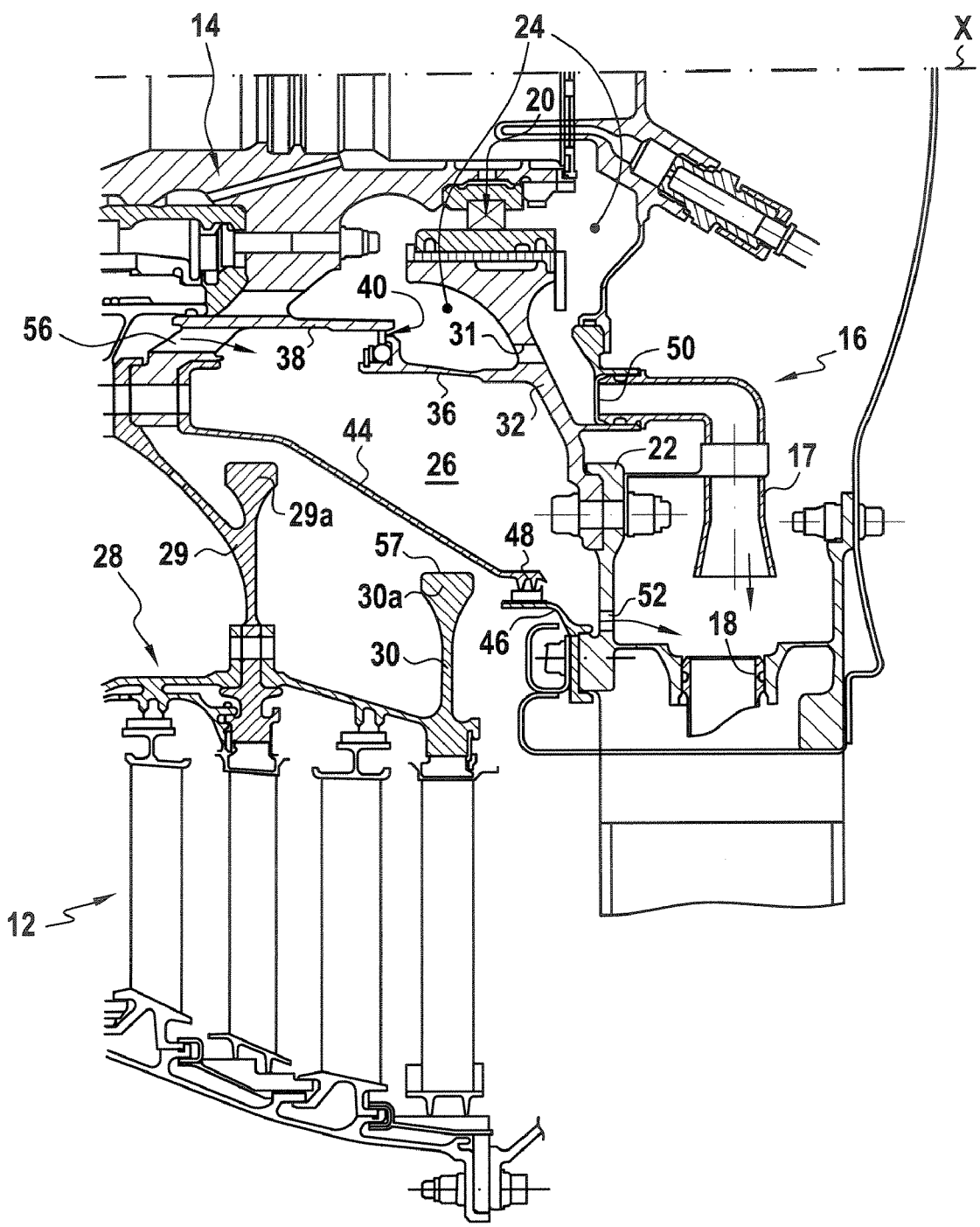

SEALING SYSTEM FOR THE REAR LUBRICATING CHAMBER OF A JET ENGINE

The invention relates to a jet engine and concerns in particular the lubrication of the rolling bearing or bearings situated in a rear lubricating chamber defined between the low pressure turbine and the shaft driven thereby.

In a conventional jet engine, the rolling bearing supporting the shaft driven by the low pressure turbine is lubricated by maintaining an oil mist in a lubricating chamber surrounding said rolling bearing. It is necessary for the lubricating chamber to have a first rotating seal since it is defined between a fixed part commonly called an exhaust housing and a rotating part consisting of the downstream end of the shaft. In the rest of the text, the terms "upstream" or "downstream" are used to designate the locations of structural elements in relation to each other while considering the direction of flow of gases in the jet engine.

The lubricating chamber is itself surrounded, radially outwards, by several recovery chambers, generally two, provided so as to prevent any oil leakages from accumulating in other parts of the engine, in particular in the rotor of the low-pressure turbine.

More precisely, said first seal is often of the labyrinth type and it establishes a link between the fixed part and the moveable part of the lubrication chamber. The latter is surrounded by a first recovery chamber of which the moveable part is itself closed by two seals of the labyrinth type, namely the first seal mentioned and a second seal installed between the rotating part of the first recovery chamber and a fixed part of a second recovery chamber surrounding the first. A third seal is installed between the shaft and the fixed part of this second recovery chamber.

The first recovery chamber is pressurized by air coming upstream from the motor. This pressurization brings about a pressure difference between the lubricating chamber and said first recovery chamber, which substantially prevents leakages of oil towards said first recovery chamber.

In the case of a leakage in the region of said first seal, oil accumulates in said first recovery chamber and is discharged at the bottom thereof.

In the case of a large leakage, oil can pass through the seal which separates the first recovery chamber from the second and accumulates therein. It is recovered by another collector situated at the bottom of said second recovery chamber.

This known architecture, with two coaxial recovery chambers, is complex and costly (three rotating seals and two recovery chambers) and increases the mass of the motor.

In addition, in certain extreme cases, it is not exceptional for oil to escape through the seal which separates the second recovery chamber from the rear part of the shaft, at a point situated inside the hub of the rotor. In this case, oil accumulates, without the possibility of discharge, between the discs of the rotor, which generates a risk of "oil imbalance" unbalancing said rotor.

The invention makes it possible to overcome all these disadvantages. It provides an architecture that is at the same time simpler, since it only has one recovery chamber, and more efficient since it is adapted so as to prevent any oil leakage towards the inside of the rotor of the turbine.

More precisely, the invention relates to a jet engine comprising a shaft driven by a turbine superimposed coaxially outside said shaft, which is supported, at the rear, by a rolling bearing situated in a lubricating chamber in which an oil mist is maintained, said lubricating chamber comprising an inner rotating part linked to the shaft and an outer fixed part separated by a first annular seal, and a pressurized recovery chamber, arranged outside said first seal and comprising two parts, a fixed part and a moveable part separated by said first seal, wherein said recovery chamber is a single one and has a second seal, situated radially externally in relation to said first seal and wherein said second seal is situated downstream from the rotor of said turbine.

The invention will be better understood and other advantages thereof will become more clearly apparent in the light of the following description of a jet engine according to its principle given solely by way of an example and made with reference to the appended drawing in which:

the single FIGURE is a partial half section of the rear part of the jet engine.

With reference to the drawing, the rear part of a jet engine has been represented, in particular the low pressure turbine 12 and the shaft 14, with an axis X which it drives in rotation. Downstream from these coaxial elements, the essential elements have been shown of an exhaust housing 16, covering among other things the means for draining and recovering oil 17, 18.

Between the shaft 14 and the turbine 12, there is situated a rear rolling bearing 20 of the shaft 14 of which the fixed part is supported by the wall 22 of the exhaust housing 16. A lubricating chamber 24 surrounds this rolling bearing 20. A single recovery chamber 26 surrounds the lubricating chamber 24, radially outside this.

The turbine comprises a rotor 28 provided with a plurality of axially spaced discs 29, 30, each having a reinforcing ring 29a, 30a in its radially most inner part.

The lubricating chamber 24 is defined between the rear end of the shaft 14 and the wall 22 of the exhaust housing. A substantially conical support 32 extends between the wall 22 of the housing and the fixed part of the rolling bearing. It is drilled with holes 31 enabling the oil mist to diffuse into all the lubricating chamber, that is to say either side of the rolling bearing.

A substantially cylindrical fixed wall element 36 extends upwards from said support 32. A substantially cylindrical rotating wall element 38 projecting to the rear of the shaft extends downstream in the direction of the fixed wall element 36. It is situated slightly radially inside the fixed wall element. The two ends of these wall elements overlap and a first rotating seal 40 is fitted between these two ends. This seal may be of the conventional labyrinth type. Use is preferably made of a seal with a carbon brush which guarantees a better seal for this use.

A moveable wall element 44, that is conical overall, widening out from upstream to downstream, extends from the end of the shaft 14, to the outside of the rotor, axially, that is to say to a point situated downstream from the last disc 30 of said rotor. The conical moveable wall element 44 extends substantially for the same radial distance as that where the reinforcing ring 30a of the last disc of the turbine is situated.

A fixed wall element 46 integral with the housing 16 extends upstream in the direction of the moveable wall element 44. The two ends of these two wall elements overlap (the fixed wall element being situated here radially outside the moveable wall element) and a second rotating seal 48 is installed between these two ends. This seal may be of the conventional labyrinth type.

In other words, according to an important feature of the invention, said second seal 48 is situated downstream from the rotor of the turbine.

In this way, the single recovery chamber 26 is defined between the fixed wall elements 32, 36 and the moveable wall elements 38, 44 and is itself closed by the two seals 40, 48 mentioned above.

A discharge orifice 50 is provided in the lower part of the lubrication chamber 24 and a discharge orifice 52 is provided in the lower part of the recovery chamber 26. The two streams join in the housing. As can be seen in the drawing, the discharge orifice 50 of said recovery chamber is situated at a radial distance that is slightly greater than that where said second seal is situated. A pump may be connected there.

Air coming from upstream enters through channels 56 in the recovery chamber, in order to keep this at a higher pressure than that in the lubrication chamber 24. The second seal is radially outside the first. Said second seal 48 is situated at a radial distance that is greater than that where the bore 57 of the ring 30 that is most downstream from said turbine is situated.

In the case where oil passes into the recovery chamber 26, this accumulates below a second seal 48 before being discharged at the lower part through the orifice 52. If part of the oil escapes from said recovery chamber, through said second seal 48, the positioning of the latter at a radial distance that is greater than the bore 57 of the last disc of the turbine, makes it possible to prevent any oil from entering the rotor. This oil will be discharged into the stream downstream to the low pressure turbine.

The invention claimed is:

1. A jet engine comprising: a shaft driven by a low pressure turbine superimposed coaxially outside said shaft, said shaft being supported, at a rear, by a rolling bearing situated between said shaft and said low pressure turbine and housed in a lubricating chamber in which an oil mist is receivable, said lubricating chamber comprising an inner rotating part linked to the shaft and an outer fixed part separated by a first annular seal, and a pressurized recovery chamber, arranged outside said first seal and comprising two parts, a fixed part and a moveable part separated by said first seal, wherein said recovery chamber is a single one and has a second seal, situated radially externally in relation to said first seal and wherein said second seal is situated downstream from the rotor of said turbine, and wherein an oil discharge orifice is provided in the lower part of said recovery chamber.

2. The jet engine as claimed in claim 1, in which said low pressure turbine comprises a rotor provided with a plurality of axially spaced discs, each having a reinforcing ring in its radially most inner part, wherein said second seal is situated at a radial distance that is greater than that where the ring of the disc that is most downstream in said turbine is situated.

3. The jet engine as claimed in claim 2, wherein said second seal is located at a radial distance that is greater than a radial distance of a bore of the most downstream ring.

4. The jet engine as claimed in claim 1, wherein said recovery chamber is the only recovery chamber surrounding the lubricating chamber and said shaft.

5. The jet engine as claimed in claim 2, wherein said first seal is located radially inward relative to said ring of the disc that is most downstream in said turbine.

6. The jet engine as claimed in claim 1, wherein said low pressure turbine comprises a rotor provided with a plurality of axially spaced discs, each having a reinforcing ring in its radially most inner part, wherein said first seal is located radially inward relative to a ring of the disc that is most downstream in said turbine.

* * * * *